Nov. 28, 1950     T. W. STEPHENSON ET AL     2,532,203
AUTOMOBILE BODY CONSTRUCTION
Filed Nov. 6, 1947
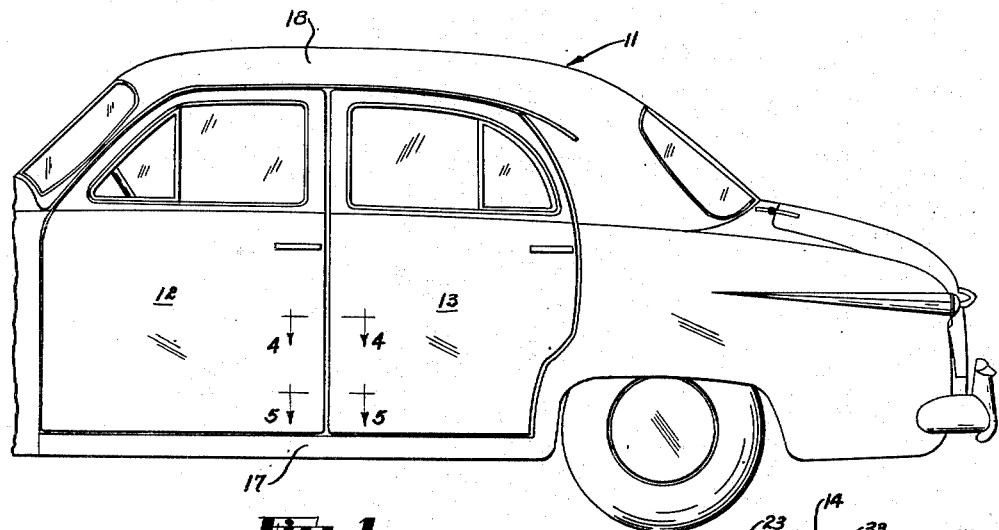
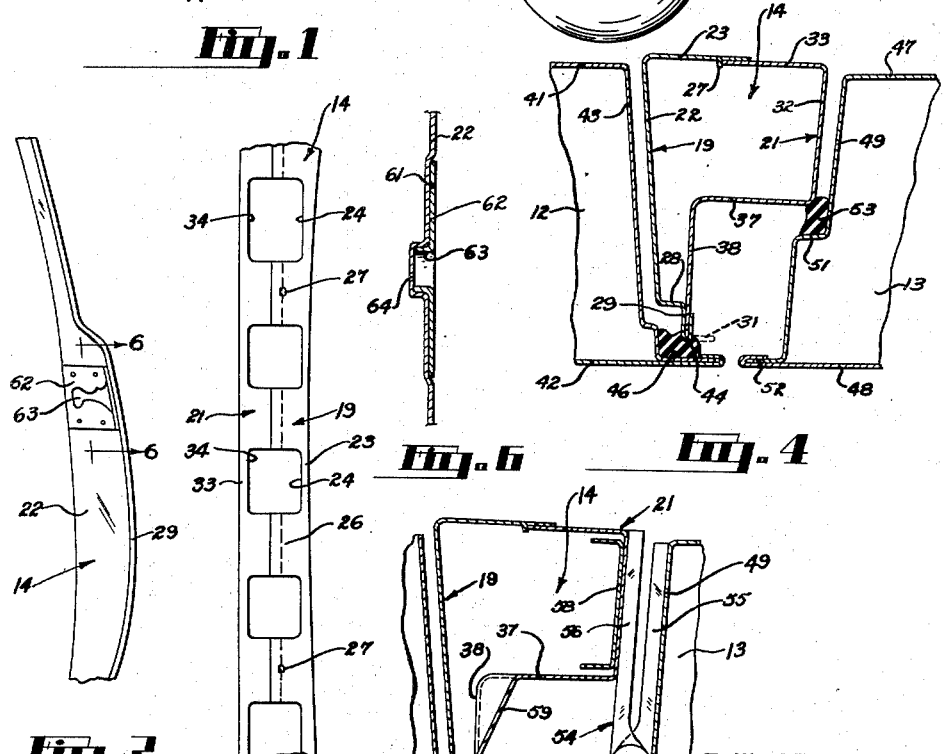
T. W. STEPHENSON
C. W. BUGBEE
INVENTORS
BY
ATTORNEYS.

Patented Nov. 28, 1950

2,532,203

UNITED STATES PATENT OFFICE 2,532,203

AUTOMOBILE BODY CONSTRUCTION

Thomas W. Stephenson, Detroit, and Charles W. Bugbee, Royal Oak, Mich., assignors to Ford Motor Company, Dearborn, Mich., a corporation of Delaware Application November 6, 1947, Serial No. 784,448

4 Claims. (Cl. 296—28)

This invention relates generally to automobile bodies and has particular reference to the construction of door pillars for automobile bodies.

Automobile bodies conventionally use box type construction sheet metal door pillars adjacent the marginal edges of the vehicle doors and particularly intermediate the front and rear doors of a four-door type body. With the latter type of door pillar, it is essential that the construction be strong since the pillar forms the only support along a considerable portion of the side of the body, and in addition the pillar must be of such construction as to provide for either hinging one side of each adjacent door or engaging and receiving the free edge of the door. Because of the ever-increasing thickness of doors in the present styling trend of automobile bodies, the pillar must be of considerable transverse dimension since it must extend from the outer face of the doors to the inner face thereof and must be constructed so as to support upholstering and wind cord assemblies at its inboard side. Heretofore such door pillars have generally been constructed of a pair of stamped parts, one of the parts being a generally U-shaped member forming the outboard side and the front and rear sides of the pillar while the other member forms the inboard side of the pillar. Although the inboard section is fairly inexpensive to manufacture since it is relatively shallow, the reverse is true of the outboard section, since it is relatively deep and requires an extremely deep draw and in addition must be of fairly complex shape to conform to the requirements of the pillar.

A primary object of the present invention is to replace the conventional type of door pillar with a construction which is the full equivalent thereof in strength and in function, yet which is considerably simpler and cheaper to manufacture and fabricate. This is accomplished by forming the pillar of a pair of co-operating sheet metal stampings one of which forms the forward portion of the pillar and the other the rearward portion thereof. The joints between the two stampings are thus respectively on the outboard and inboard sides of the pillar. The stamped members are each relatively shallow and of such configuration that they are relatively easy to form and require less expensive dies and equipment.

Another object of the invention is to provide a door pillar of the type described in which the outboard side is offset inwardly adjacent a door hinged to the pillar to provide clearance for the inward swinging of the adjacent edge of the door when it is opened and to permit hinging the door about an axis located intermediate the inboard and outboard sides of the door. A further object is to provide a unique construction for providing a weathertight seal between the door pillar and the door hinged thereto.

Still another object of the present invention is to provide a door pillar having an outwardly projecting vertical flange which is substantially offset from the transverse center line of the pillar and is arranged to be overlapped by the projecting marginal flange of one of the adjacent doors to co-operate therewith and with a sealing strip to form a weathertight seal therebetween. The arrangement is such that the outboard sides of the two adjacent doors are arranged in alignment with each other and are slightly spaced from each other to form a neat appearance without the necessity of providing a flange or rib of the door pillar projecting between the adjacent edges of the doors and forming part of the exterior surface of the body.

Other objects and advantages of the present invention will be made more apparent as this description proceeds, particularly when considered in connection with the accompanying drawings, in which:

Figure 1 is a fragmentary side elevational view of an automobile body incorporating the present invention.

Figure 2 is an enlarged front elevational view of the center door pillar of the body shown in Figure 1.

Figure 3 is an inside elevation of the door pillar.

Figure 4 is an enlarged horizontal cross sectional view through the door pillar and the adjacent doors taken substantially on the plane indicated by the line 4—4 of Figure 1.

Figure 5 is a cross sectional view similar to Figure 4 but taken on the plane indicated by the line 5—5 of Figure 1 and being through the lower door hinge.

Figure 6 is a cross sectional view taken substantially on the plane indicated by the line 6—6 of Figure 2, illustrating the striker plate construction on the door pillar.

Referring now more particularly to the drawings, there is shown in Figure 1 an automobile body 11 having front and rear doors 12 and 13 respectively separated by a door pillar 14. The forward edge of the front door 12 is conventionally hinged to the adjacent body panel while the rear edge of the door swings outwardly from the body to open position. The rear door 13 is similarly pivoted at its forward edge, being hinged to the door pillar 14 as will be described more in detail hereinafter. The door pillar extends between the floor panel 17 and the roof panel 18 of the body, being suitably welded thereto to form an integral structure.

As seen in Figure 2, the door pillar varies considerably in its lateral dimension from the top to the bottom thereof, in accordance with the styling of the body and the thickness of the adjacent doors. In recent years the styling trend has been such as to substantially increase the thickness of automobile doors, requiring thicker door pillars and increasing the difficulty of fabrication of the pillars when constructed in the conventional manner. While the door pillar of the present invention is adapted for all types of vehicle bodies it is particularly advantageous when used in connection with bodies utilizing relatively thick doors.

The door pillar 14 is formed of two co-operating sheet metal stampings 19 and 21. Each of the stampings is generally channel shaped in cross section, with the stamping 19 forming the forward portion of the door pillar and the stamping 21 the rearward portion thereof. The forward stamping 19 has a planar face 22 extending generally transversely of the vehicle and is formed with a flange 23 extending rearwardly from the inboard edge of the face. As best seen in Figure 3, the inboard flange 23 of the forward section of the pillar is formed with a plurality of vertically spaced rectangular cutout portions 24 forming projecting tongues 26 therebetween. An outwardly projecting tab 27 is struck out from certain of the tongues 26 to form a locating stop for the adjacent edge of the other pillar section, as will be described later.

At its outboard edge, the face 22 of the forward section 19 is bent first rearwardly to form a flange 28 then outwardly to form a marginal flange 29. It will thus be seen that the front generally U-shaped section 19 is relatively shallow and can be easily and inexpensively formed by a simple stamping operation. When initially formed the outer extremity of the marginal flange 29 is then bent rearwardly as shown at 31 in dotted lines in Figure 4, from which position it is later bent inwardly to embrace the outer edge of the adjacent flange of the rearward section 21.

The rearward section 21 of the pillar is likewise generally U-shaped in cross section and has a rearward face 32 and a forwardly projecting flange 33 extending from the inboard edge of the face 32 to form part of the inner surface of the pillar. As best seen in Figure 3, the inboard flange of the rearward section is provided with rectangular cutout portions 34 arranged in registration with the complementary cutout portions 24 of the inboard flange 23 of the forward pillar section. During the assembly of the front and rear pillar sections, the inboard flange 33 of the rear section is telescoped within the inboard flange 23 of the front section so as to be arranged in overlapping relationship therewith. The tabs 27 provided on the tongues 26 of the front section form stops which engage the marginal edges of the tongues 36 formed on the inboard flange 33 of the rear section intermediate the cutout portions 34. The overlapping portions of the two flanges are then secured together, preferably by spot-welding.

Referring to Figure 4, it will be noted that the face 32 of the rear section 21 of the pillar extends for only a portion of the over-all transverse extent of the pillar, and is bent forwardly at approximately the longitudinal center of the pillar to form a longitudinally extending flange 37. At the forward extremity of the longitudinal flange 37, the rear pillar section is bent outwardly to form a marginal flange 38 extending generally parallel to the face 32.

It will be noted from Figures 4 and 5 that the outboard portion of the marginal flange 38 of the rear pillar section engages the marginal flange 29 of the front pillar section. During assembly the initially rearwardly extending part 31 of the flange 29 is bent inwardly around the outer portion of the marginal flange 38, after which the joint formed by the flanges 29, 38, and 31 is spot-welded together to form an integral assembly.

The rear pillar section 21 is also a relatively simple stamping to form and the assembly of the front and rear sections to each other is likewise easily accomplished. This is facilitated, of course, by the locating tabs 27 at the inboard side of the pillar and by the fact that the corner between the flanges 29 and 31 of the front section form locating means for the assembly at this point. The resulting pillar is therefore economical to manufacture and possesses the requisite strength. The joint between the two sections at the inboard side of the pillar is covered by the upholstery material conventionally mounted thereon, while the joint at the outboard side of the pillar is in the form of a neat appearing rolled edge which is only visible when the front door 12 is open. The front and rear faces of the pillars have no joints, and may be readily formed to any desired shape to meet the requirements of the particular body design.

As previously mentioned, the front door 12 is hinged at its forward edge, and comprises inner and outer door panels 41 and 42 respectively with the inner panel 41 formed to provide a jamb face 43 extending generally parallel to the forward face 22 of the front pillar section 19. The inner and outer door panels are suitably joined together to form a longitudinally extending marignal flange 44 at the outboard rear vertical edge of the door. A resilient weatherstrip 46 is cemented or otherwise suitably secured to the front door 12 in the corner formed between the jamb face 43 and the rear marginal flange 44, and it will be seen that the weatherstrip is in a position to be engaged by the outwardly extending bead of the door pillar which is formed by the flanges 29, 38, and 31. Thus, a weathertight seal is provided between the front door and the door pillar and the aforementioned bead is completely concealed when the door is closed.

The rear door 13 is similarly formed of an inner panel 47 and an outer panel 48 and with a stepped jamb face 49 having an intermediate shoulder 51 and a marginal flange 52 at the forward outboard vertical edge of the door. A resilient sealing strip 53 is mounted upon the rear door at the shoulder 51 formed in the jamb face 49, and is in such position as to engage the intermediate corner of the door pillar formed between the rearward face 32 and the longitudinal flange 37 thereof to form a weathertight seal between the door pillar and the rear door.

It will be noted that in the closed positions of the front and rear doors a narrow clearance space is left between the adjacent marginal flanges 44 and 52 thereof. This compensates for minor manufacturing variations in the body and yet presents a trim appearance. No part of the door pillar projects to the outer surface of the car body and it is consequently possible to secure a properly fitting construction without the necessity of holding close tolerances between the adjacent portions of the doors and the pillar, as is necessary in the conventional construction in which a portion of the door pillar projects to the outer surface of the body between the front and rear doors.

Referring now to Figure 5, it will be seen that the rear door 13 is mounted for swinging movement upon the door pillar 14 by means of a hinge 54 having front and rear hinge sections 55 and 56 pivotally connected together by a hinge pin 57. Figure 5 shows the hinge 54 at a lower extremity of the door, a similar hinge being provided adjacent the upper portion thereof. The front hinge section 56 is bolted or otherwise suitably secured to the door pillar 14, a reinforcing channel 58 being provided on the inner side of the rear face 32 of the pillar to strengthen the latter. The rearward hinge section 55 is similarly suitably secured to the jamb face 49 of the rear door 13. The arrangement is such that the hinge pin 57 forming the pivotal axis of the door is located intermediate the inboard and outboard sides of the door. The marginal flange 52 of the door extends forwardly of the hinge pin axis so that during opening of the door it swings inwardly. The offset portion provided in the outboard face of the door pillar by the longitudinal flange 37 and the marginal flange 38 of the rear section of the door pillar provides an adequate clearance space for the inward swinging of this marginal flange. The door pillar is further strengthened at this point by a series of vertically spaced ribs 59 struck outwardly from the rear pillar section at the junction of the flanges 37 and 38 thereof.

As best seen in Figures 2 and 6, the forward face 22 of the door pillar 14 is recessed at 61 to receive a striker plate 62 in such manner that the face of the striker plate is flush with the surface of the face 22. The striker plate has a groove 63 formed therein to co-operate with the door lock (not shown) carried by the adjacent door 12. The recess 61 is deepened at 64 to accommodate the grooved part of the striker plate and to provide a base for the groove 63.

While the construction disclosed and described is particularly designed for use as a door pillar intermediate the front and rear doors of a four-door sedan, the principles of construction utilized in this door pillar may also be used to advantage in the body pillars provided elsewhere in the vehicle body, as for example, adjacent the other edges of the various doors.

Although we have shown and described certain embodiments of the invention, it will be understood that we do not wish to be limited to the exact construction shown and described, but that various changes and modifications may be made without departing from the spirit and scope of our invention, as defined in the appended claims.

What is claimed is:

1. In a vehicle body, in combination, front and rear doors on one side of said body, a generally vertical door pillar rigidly mounted on said body between said front and rear doors, one of said doors being hinged to said door pillar for pivotal movement about a vertical axis located intermediate the inboard and outboard sides of said last-mentioned door, said door having a marginal flange overlapping said door pillar and projecting longitudinally beyond the pivotal axis of said door, said door pillar being generally rectangular in cross section with its outboard side being offset inwardly adjacent said last-mentioned door to provide clearance for the inward swinging of the adjacent edge of said door as it is opened, the offset in said door pillar forming a shoulder at the side of said door pillar substantially midway between the inboard and outboard edges thereof, and a weather strip carried by the door hinged to said pillar, said weatherstrip being secured to said door substantially midway between its inboard and outboard sides and arranged to continuously engage said shoulder in the closed position of said door.

2. In a vehicle body, in combination, front and rear doors on one side of said body, a generally vertical door pillar rigidly mounted on said body between said front and rear doors, one of said doors being hinged to said door pillar for pivotal movement about a vertical axis located intermediate the inboard and outboard sides of said last-mentioned door, said door pillar being generally rectangular in cross section with its outboard side being offset inwardly adjacent said last-mentioned door to provide clearance for the inward swinging of the adjacent edge of said door as it is opened, said offset extending for more than half the longitudinal extent of the outboard face of said door pillar to form a relatively narrow section extending outwardly from said door pillar adjacent one extremity of said offset, the other of said doors being hinged to said body at the side of said other door remote from said pillar and having a marginal flange at its unhinged side overlying said narrow section of the door pillar in the closed position of said other door, and a sealing strip carried by said other door at said marginal flange engageable with said narrow section to provide a seal between said other door and said door pillar.

3. In a vehicle body having two adjacent doors on one side thereof, a door pillar mounted on said body between the adjacent edges of said doors, said pillar comprising a pair of vertically extending channels facing each other with the bases of said channels extending generally transversely of said vehicle, the inboard legs of said channels being arranged in overlapping relation and secured together, and the longitudinally extending legs at the outboard side of said channels each having a flange extending laterally outwardly therefrom and secured together to form a joint, said joint being located at one side of the transverse center line of said pillar.

4. The structure defined by claim 3 which is further characterized in that each of said doors has a marginal flange projecting therefrom with the marginal flange of one of said doors overlapping said joints and the marginal flange of the other of said doors being in alignment therewith and slightly spaced therefrom, and a sealing strip forming a weathertight seal between the outboard joint of said door pillar and the adjacent marginal door flange.

THOMAS W. STEPHENSON.
CHARLES W. BUGBEE.

REFERENCES CITED

The following references are of record in the file of this patent:

UNITED STATES PATENTS

| Number | Name | Date |
|---|---|---|
| 1,098,393 | O'Brien | June 2, 1914 |
| 1,300,991 | Miller | Apr. 15, 1919 |
| 1,642,368 | Heintz | Sept. 13, 1927 |
| 1,949,581 | Place | Mar. 6, 1934 |
| 2,116,330 | Tjaarda | May 3, 1938 |
| 2,167,664 | Matthews | Aug. 1, 1939 |
| 2,209,659 | Mercer | July 30, 1940 |
| 2,248,319 | Waterhouse, Jr. | July 8, 1941 |
| 2,307,445 | Benzick | Jan. 5, 1943 |
| 2,344,805 | Dall | Mar. 21, 1944 |
| 2,488,471 | Kramer et al. | Nov. 15, 1949 |